US009049372B2

(12) United States Patent
Nakai et al.

(10) Patent No.: US 9,049,372 B2
(45) Date of Patent: Jun. 2, 2015

(54) ELECTRONIC CAMERA, COMPUTER READABLE MEDIUM RECORDING IMAGING CONTROL PROGRAM THEREON AND IMAGING CONTROL METHOD

(71) Applicant: CASIO COMPUTER CO., LTD., Tokyo (JP)

(72) Inventors: Takao Nakai, Tokyo (JP); Rie Komiya, Tokyo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 65 days.

(21) Appl. No.: 13/659,013

(22) Filed: Oct. 24, 2012

(65) Prior Publication Data

US 2013/0107106 A1    May 2, 2013

(30) Foreign Application Priority Data

Nov. 2, 2011   (JP) ................................ 2011-241309

(51) Int. Cl.
H04N 5/232        (2006.01)
H04N 5/235        (2006.01)
H04N 5/355        (2011.01)

(52) U.S. Cl.
CPC ....... *H04N 5/23245* (2013.01); *H04N 5/23277* (2013.01); *H04N 5/23258* (2013.01);
(Continued)

(58) Field of Classification Search
CPC .......... H04N 5/23245; H04N 5/23248; H04N 5/2327; H04N 5/23277; H04N 5/2355; H04N 5/23267
USPC ............... 348/208.4, 208.12, 208.16, 240.99, 348/240.3
See application file for complete search history.

(56) References Cited

U.S. PATENT DOCUMENTS 5,867,213 A *  2/1999  Ouchi ........................ 348/208.5
6,029,015 A    2/2000  Ishiguro
(Continued)

FOREIGN PATENT DOCUMENTS

JP    04-310076 A    11/1992
JP    08-171118 A    7/1996
(Continued)

OTHER PUBLICATIONS

Japanese Office Action dated Feb. 26, 2013 (and English translation thereof) in counterpart Japanese Application No. 2011-241309.
(Continued)

*Primary Examiner* — Daniel M Pasiewicz
(74) *Attorney, Agent, or Firm* — Holtz, Holtz, Goodman & Chick PC

(57) ABSTRACT

Determination is made whether or not a cross point coordinate of a zoom value and a degree of luminance belongs to the continuous imaging area of a two-dimensional coordinate plane. When the cross point coordinate is in a single imaging area, since the provability of shake occurrence is low, a first imaging processing is operated. In contrast, when the cross point coordinate is in the continuous imaging area, a shake correction flag representing the execution of the shake correction is set. A multiplane addition composition imaging is not performed uselessly under an imaging condition where the provability of shake occurrence is low. As a result, since the multiplane addition composition imaging is not performed without inevitability, it is possible to avoid a disadvantage that a useless addition processing is executed to thereby generate noise in a shot image stored in an image memory medium.

12 Claims, 4 Drawing Sheets

(52) U.S. Cl.
CPC ........ *H04N5/23267* (2013.01); *H04N 5/23296* (2013.01); *H04N 5/2353* (2013.01); *H04N 5/35572* (2013.01); *H04N 5/35581* (2013.01)

(56) References Cited

U.S. PATENT DOCUMENTS

| | | | |
|---|---|---|---|
| 7,095,001 B2 | 8/2006 | Kawahara | |
| 7,680,402 B2 | 3/2010 | Chujo et al. | |
| 7,965,317 B2 * | 6/2011 | Tico et al. | 348/208.4 |
| 8,081,220 B2 * | 12/2011 | Kawai | 348/208.12 |
| 8,179,472 B2 * | 5/2012 | Asoma | 348/362 |
| 8,306,413 B2 | 11/2012 | Ichikawa | |
| 2004/0095472 A1 * | 5/2004 | Yoshida et al. | 348/208.12 |
| 2006/0087562 A1 * | 4/2006 | Nakanishi et al. | 348/208.12 |
| 2008/0143840 A1 * | 6/2008 | Corkum et al. | 348/208.6 |
| 2008/0170124 A1 | 7/2008 | Hatanaka et al. | |
| 2011/0304738 A1 | 12/2011 | Murakami | |

FOREIGN PATENT DOCUMENTS

| | | |
|---|---|---|
| JP | 11-266390 A | 9/1999 |
| JP | 2001-230965 A | 8/2001 |
| JP | 2003270692 A | 9/2003 |
| JP | 2005-033785 A | 2/2005 |
| JP | 2005-079841 A | 3/2005 |
| JP | 2005-136760 A | 5/2005 |
| JP | 2005-186639 A | 7/2005 |
| JP | 2005-195656 A | 7/2005 |
| JP | 2006-352610 A | 12/2006 |
| JP | 2007-142554 A | 6/2007 |
| JP | 2007-180904 A | 7/2007 |
| JP | 2007-279394 A | 10/2007 |
| JP | 2007-312348 A | 11/2007 |
| JP | 2008-092005 A | 4/2008 |
| JP | 2009-135561 A | 6/2009 |
| JP | 2009-218911 A | 9/2009 |
| JP | 2010-093679 A | 4/2010 |
| JP | 2010-204160 A | 9/2010 |
| JP | 2011-059291 A | 3/2011 |
| JP | 2011-164536 A | 8/2011 |

OTHER PUBLICATIONS

Japanese Office Action dated Apr. 9, 2013 (and English translation thereof) in counterpart Japanese Application No. 2011-241309.
Japanese Office Action dated Sep. 3, 2013 (and English translation thereof) in counterpart Japanese Application No. 2013-140916.
Japanese Office Action dated Dec. 3, 2013 (and English translation thereof) in counterpart Japanese Application No. 2013-140916.
Japanese Office Action dated Mar. 11, 2014 issued in counterpart Japanese Application No. 2013-140916.

* cited by examiner

ELECTRONIC CAMERA, COMPUTER READABLE MEDIUM RECORDING IMAGING CONTROL PROGRAM THEREON AND IMAGING CONTROL METHOD

CROSS-REFERENCE TO RELATED APPLICATION(S)

This application is based upon and claims the benefit of priority from Japanese Patent Application No. 2011-241309, filed Nov. 2, 2011; the entire contents of (all of) which are incorporated herein by reference.

BACKGROUND OF THE INVENTION

1. Field of the Invention

The present invention relates to an electronic camera for imaging an object and recording the shot object as a still image, and also relates to a computer readable medium recording an imaging control program thereon and an imaging control method.

2. Description of the Related Art

The shake correction methods having been applied in cameras are roughly classified into the optical shake correction and the electronic shake correction. The optical shake correction relates to a method of driving a part of an optical system by using an actuator. On the other hand, as the electronic shake correction, there is known a method in which a plurality of continuous images are shot and the corresponding pixels of the respective shot images are added to each other (see JP-A-2001-230965, for example).

In the method of adding the pixels of the plurality of continuous shot images, there arises a disadvantage that, depending on the imaging condition, noise is generated at the time of adding the plurality of images. When the imaging is performed under the condition requiring the shake correction, the pixel addition of the plurality of continuous shot images acts as an effective shake correction means. However, when the similar pixel addition is executed in the case where the imaging is performed under the condition of not requiring the shake correction, useless degradation of image quality is caused due to the aforesaid disadvantage.

In the aforesaid related art, since the shake correction is executed without determining whether or not the shake correction is necessary, the useless degradation of image quality is caused inevitably.

SUMMARY OF THE INVENTION

The first mode of an electronic camera according to this invention includes an optical system, an imaging unit, a first imaging processing unit, a second imaging processing unit, a control unit and a zoom detection unit. The optical system has a zoom function and provides an image of an object. The imaging unit performs an exposure to take the image of the object and obtains image data of the object. The first imaging processing unit exposes the imaging unit once with a suitable exposure time being set and outputs the obtained image data. The second imaging processing unit exposes the imaging unit for plural times continuously each with an exposure time which is shorter than the set suitable exposure time and executes an addition processing of adding respective image data obtained sequentially for the plural times of exposures. The control unit operates one of the first imaging processing unit and the second imaging processing unit in accordance with a circumstance at a time of imaging. The zoom detection unit detects a zoom value of the optical system. The control unit makes operable only the first imaging processing unit when the detected zoom value is equal to or smaller than a predetermined reference value. The control unit makes selectively operable one of the first imaging processing unit and the second imaging processing unit when the detected zoom value is larger than the predetermined reference value.

The second mode of an electronic camera according to this invention includes an optical system, an imaging unit, a first imaging processing unit, a second imaging processing unit, a parameter detection unit, a memory unit and a control unit. The optical system provides an image of an object. The imaging unit performs an exposure to take the image of the object and obtains image data of the object. The first imaging processing unit exposes the imaging unit once with a suitable exposure time being set and outputs the obtained image data. The second imaging processing unit exposes the imaging unit for plural times continuously each with an exposure time which is shorter than the set suitable exposure time and executes an addition processing of adding respective image data obtained sequentially for the plural times of exposures. The parameter detection unit detects at least two kinds of parameters relating to the image of the object. The memory unit stores a table which is configured by a coordinate plane defined by one parameter axis representing parameter values of one of the at least two kinds of parameters and another parameter axis representing parameter values of another of the at least two kinds of parameters. The coordinate plane is divided by a slanted boundary line into a single imaging area for operating the first imaging processing unit and a continuous imaging area for operating the second imaging processing unit. The control unit determines whether a coordinate position is in the single imaging area or in the continuous imaging area and operates one of the first imaging processing unit and the second imaging processing unit in accordance with a determination of the control unit. The coordinate position in the table corresponds to a value of the one kind of parameter and another value of the said another kind of parameter detected by the parameter detection unit.

The first mode of a non-transitory computer readable medium according to this invention stores a program causing a computer to execute an imaging control process. The computer includes an optical system, an imaging unit and a zoom detection unit. The optical system has a zoom function and provides an image of an object. The imaging unit performs an exposure to take the image of the object and obtains image data of the object. The zoom detection unit detects a zoom value of the optical system. The imaging control process includes: first imaging processing to expose the imaging unit once with a suitable exposure time being set to thereby output the obtained image data; second imaging processing to expose the imaging unit for plural times continuously each with an exposure time which is shorter than the set suitable exposure time to thereby execute an addition processing of adding respective image data obtained sequentially for the plural times of exposures; and operating one of the first imaging processing and the second imaging processing in accordance with a circumstance at a time of imaging; operating only the first imaging processing when the detected zoom value is equal to or smaller than a predetermined reference value, and operating one of the first imaging processing and the second imaging processing when the detected zoom value is larger than the predetermined reference value.

The second mode of a non-transitory computer readable medium according to this invention stores a program causing a computer to execute an imaging control process. The computer includes an optical system, an imaging unit and a memory unit. The optical system provides an image of an object. The imaging unit performs an exposure to take the image of the object and obtains image data of the object. The memory unit stores a table which is configured by a coordinate plane defined by axes respectively representing at least two kinds of parameters relating to the image of the object. The coordinate plane is divided by a slanted boundary line into a single imaging area and a continuous imaging area. The imaging control process includes: first imaging processing to expose the imaging unit once with a suitable exposure time being set to thereby output the obtained image data; second imaging processing to expose the imaging unit for plural times continuously each with an exposure time which is shorter than the set suitable exposure time and to thereby execute an addition processing of adding respective image data obtained sequentially for the plural times of exposures; detecting parameters relating to the respective axes of the table; determining whether a coordinate position is in the single imaging area or in the continuous imaging area, the coordinate position in the table corresponding to the detected values of the respective parameters; and operating one of the first imaging processing and the second imaging processing in accordance with the determining.

The first mode of a imaging control method according to this invention is for a imaging apparatus. The imaging apparatus includes an optical system, an imaging unit and a zoom detection unit. The optical system has a zoom function and provides an image of an object. The imaging unit performs an exposure to take the image of the object and obtains image data of the object. The zoom detection unit detects a zoom value of the optical system. The imaging control method includes: first imaging processing to expose the imaging unit once with a suitable exposure time being set to thereby output the obtained image data; second imaging processing to expose the imaging unit for plural times continuously each with an exposure time which is shorter than the set suitable exposure time to thereby execute an addition processing of adding respective image data obtained sequentially for the plural times of exposures; operating one of the first imaging processing and the second imaging processing in accordance with a circumstance at a time of imaging; operating only the first imaging processing when the detected zoom value is equal to or smaller than a predetermined reference value; and operating one of the first imaging processing and the second imaging processing when the detected zoom value is larger than the predetermined reference value.

The second mode of a imaging control method according to this invention is for a imaging apparatus. The imaging apparatus includes an optical system, an imaging unit and a memory unit. The optical system provides an image of an object. The imaging unit performs an exposure to take the image of the object and obtains image data of the object. The memory unit stores a table which is configured by a coordinate plane defined by axes respectively representing at least two kinds of parameters relating to the image of the object. The coordinate plane is divided by a slanted boundary line into a single imaging area and a continuous imaging area. The imaging control method includes: first imaging processing to expose the imaging unit once with a suitable exposure time being set to thereby output the obtained image data; second imaging processing to expose the imaging unit for plural times continuously each with an exposure time which is shorter than the set suitable exposure time and to thereby execute an addition processing of adding respective image data obtained sequentially for the plural times of exposures; detecting parameters relating to the respective axes of the table; determining whether a coordinate position is in the single imaging area or in the continuous imaging area, the coordinate position in the table corresponding to the detected values of the respective parameters; and operating one of the first imaging processing and the second imaging processing in accordance with the determining.

DETAILED DESCRIPTION OF THE PREFERRED EMBODIMENTS

Figure 1:
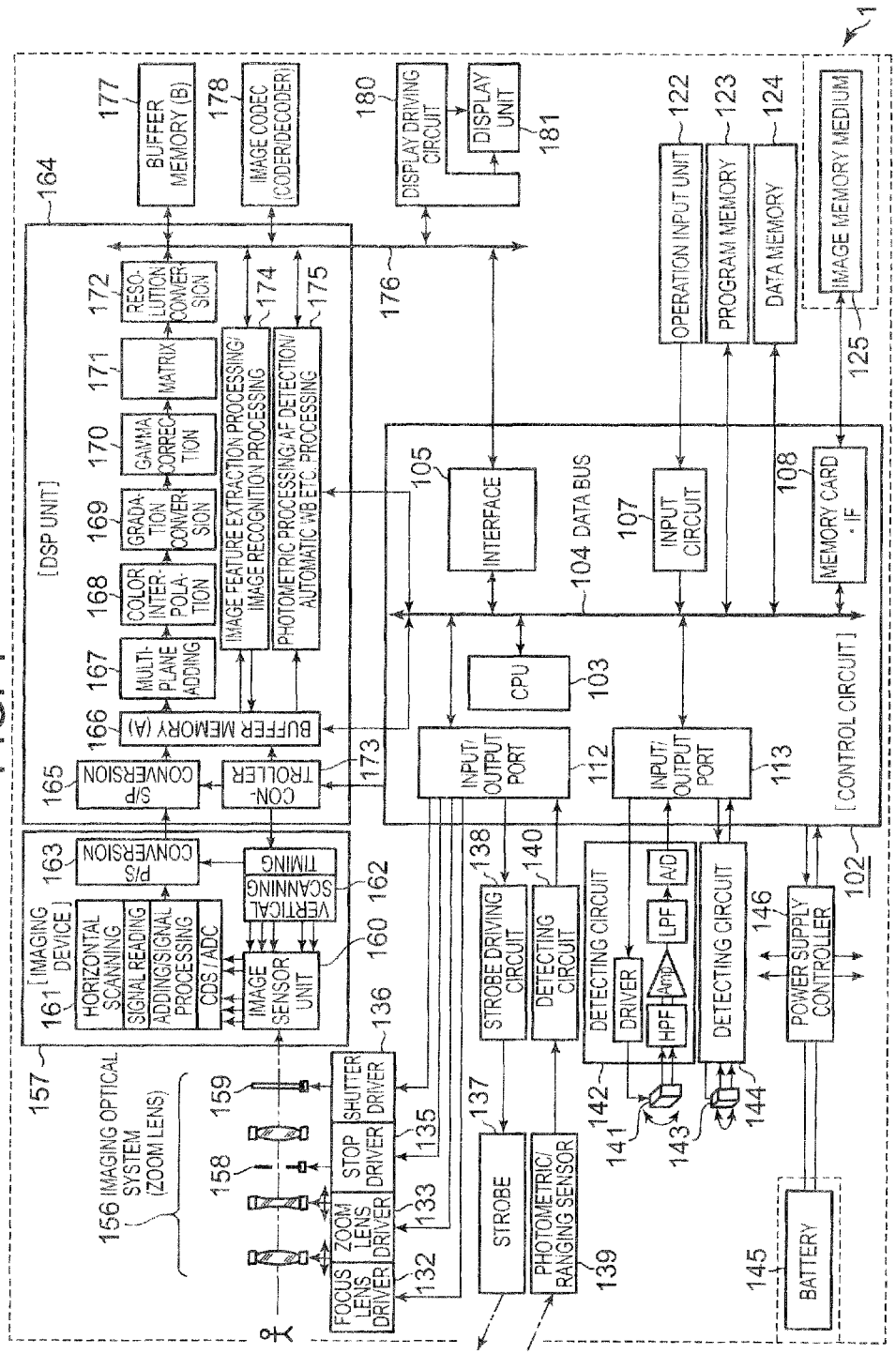
FIG. 1 is a block diagram showing the circuit configuration of a digital camera according to an embodiment of this invention.

Hereinafter, an embodiment of this invention will be explained with reference to drawings. FIG. 1 is a block diagram showing the circuit configuration of a digital camera 1 according to the embodiment. The digital camera 1 includes a control circuit 102. The control circuit 102 is provided with a CPU 103, and is further provided with an interface 105, an input circuit 107, a memory card•IF 108 and input/output ports 112, 113 each of which is coupled to the CPU 103 via a data bus 104. An operation input unit 122, provided with various kinds of operation keys such as a shutter button and a zoom key and a power supply switch etc., is coupled to the input circuit 107. An image memory medium 125 provided so as to be detachable freely is coupled to the memory card•IF 108. The shutter button has a half shutter function capable of performing a half-pressing and a full-pressing.

To the input/output port 112, a focus lens driving unit 132, a zoom lens driving unit 133, a stop driving unit 135 and a shutter driving unit 136 are coupled, and a strobe 137 is coupled via a strobe driving circuit 138, and further a photometric/ranging sensor 139 is connected via a detecting circuit 140. To the input/output port 113, an angular velocity sensor (Y/Pitch) 141 for detecting the shake in the elevational direction of the digital camera 1 and an angular velocity sensor (X/Yaw) 143 for detecting the shake in the transversal direction are coupled via detecting circuits 142, 144, respectively.

A battery 145 is coupled to the control circuit 102 via a power supply control unit 146. The power supply control unit 146 supplies electric power supplied from the battery 145 to the respective units under the control of the control circuit 102. Further, a program memory 123 and a data memory 124 are coupled to the data bus 104. The program memory 123 stores a program for controlling the control circuit 102 so as to perform the operation shown in a flow chart described later. The data memory 124 stores various kinds of data in advance and also stores data other than image data.

On the other hand, an imaging device 157 is disposed on an optical axis on the rear side of an imaging optical system 156 including a zoom lens. Within the imaging optical system 156, a stop 158 driven by the stop driving unit 135 and a shutter 159 driven by the shutter driving unit 136 are disposed. The focus lens driving unit 132 drives a focus lens within the imaging optical system 156, and the zoom lens driving unit 133 is configured to be controlled in accordance with the operation of the zoom key provided at the operation input unit 122 so as to drive the zoom lens.

The imaging device 157 can perform the high-speed reading such as the parallel reading and includes an image sensor unit 160, a horizontal scanning unit 161, a vertical scanning unit 162 and a parallel/serial (P/S) conversion unit 163. A digital signal processor (DSP) unit 164 is coupled to the imaging device 157. The DSP unit 164 includes a serial/parallel (S/P) conversion unit 165 for processing an image signal taken from the P/S conversion unit 163 of the imaging device 157, a buffer memory (A) 166, a multi-plane adding unit 167, a color interpolation unit 168, a gradation conversion unit 169, a gamma correction unit 170, a matrix 171, a resolution conversion unit 172. The DSP unit 164 further includes a controller 173 for controlling the period of the vertical scanning unit 162, an image feature extraction processing/image recognition processing unit 174 and a photometric processing/auto-focus (AF) detection/automatic white-balance (WB) etc. processing unit 175.

Each of the resolution conversion unit 172, the image feature extraction processing/image recognition processing unit 174 and the photometric processing/AF detection/automatic WB etc. processing unit 175 is coupled to a buffer memory (B) 177, an image coder and decoder (CODEC) 178 and a display driving circuit 180 via an image data bus 176. The image data bus 176 is coupled to the interface 105 of the control circuit 102. The buffer memory (B) 177 temporarily stores image data used when the image CODEC 178 performs the coding/decoding processing. The display driving circuit 180 drives a display unit 181.

Figure 2:
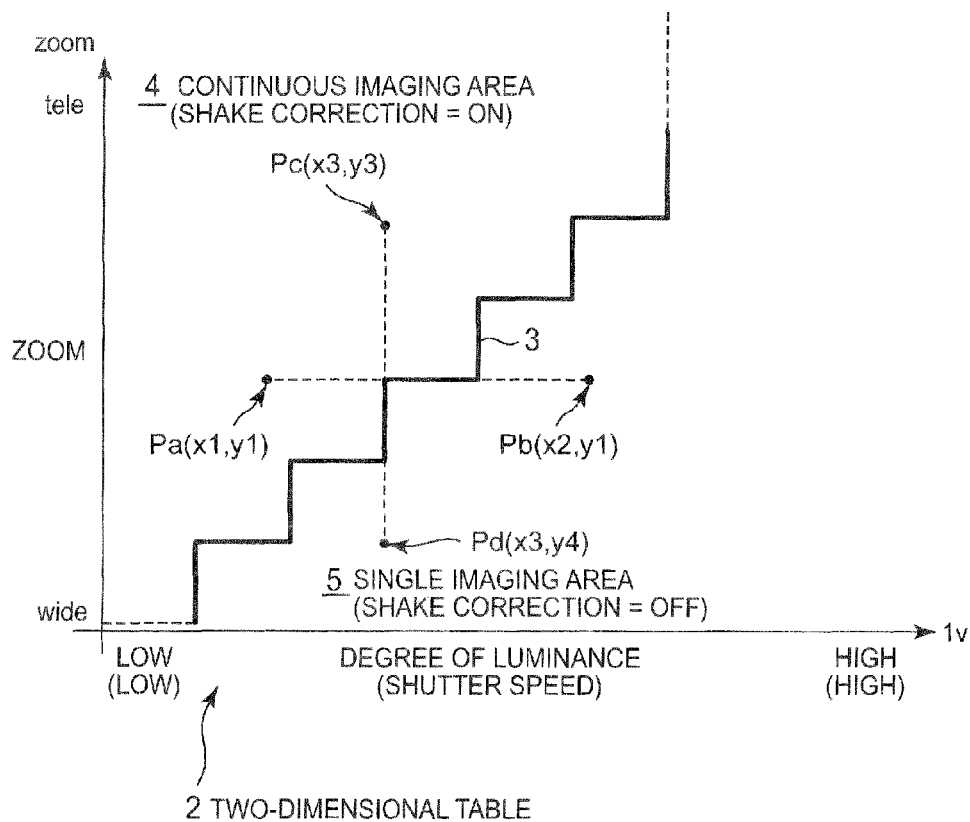
FIG. 2 is an explanatory diagram showing the summary of a two-dimensional table in this embodiment.

FIG. 2 is an explanatory diagram showing the summary of a two-dimensional table 2 stored in advance in the data memory 124. As the abscissa of the two-dimensional table 2, the degree of luminance detected by the photometric/ranging sensor 139 and the detecting circuit 140, that is, the degree of luminance of the image of a shot object imaged on the imaging device 157 by the imaging optical system 156 is set, whilst a zoom value is set as the ordinate. As additionally described in the abscissa, the shutter speed is set to be lower as the degree of the luminance becomes lower and set to be higher as the degree of the luminance becomes higher.

A critical line 3 is set within a two-dimensional coordinate plane in which these degrees of luminance and the zoom values are set. The coordinate plane is divided into a continuous imaging area 4 and a single imaging area 5 by the critical line 3. The critical line 3 may include a boundary line. The continuous imaging area 4 is defined as an area that a shake correction flag is determined to be set (ON) when a coordinate position corresponding to the combination of the degree of luminance and the zoom value belongs to the continuous imaging area 4. In contrast, the single imaging area 5 is defined as an area that the shake correction flag is determined to be reset (OFF) when a coordinate position corresponding to the combination of the degree of luminance and the zoom value belongs to the single imaging area 5. As shown in FIG. 2, the critical line 3 is provided in a stepwise manner at positions where increase and decrease of parameter values of the abscissa change in accordance with changes of increase and decrease of parameter value of the ordinate.

That is, as shown in the figure, supposing a point Pa where the degree of luminance is "x1" and the zoom value is "y1" and a point Pb where the degree of luminance is "x2" and the zoom value is the same value of "y1", the point Pa (x1, y1) belongs to the continuous imaging area 4. However, as to the point Pb (x2, y1), although the zoom value is the same value of y1, the degree of luminous is higher, so that this point belongs to the single imaging area 5. Further, as shown in the figure, supposing a point Pc where the degree of luminance is "x3" and the zoom value is "y3" and a point Pd where the degree of luminance is the same value of "x3" and the zoom value is a different value of "y4", the point Pc (x3, y3) belongs to the continuous imaging area 4. However, as to the point Pd (x3, y4), although the degree of luminous is the same degree of x3, the zoom value is smaller, so that this point belongs to the single imaging area 5.

Thus, this two-dimensional table 2 has the characteristics that coordinate position within this table is determined to belong to the continuous imaging area 4 according to the increase of the zoom value thereof and also according to the reduction of the degree of luminance thereof (that is, according to the increase of provability of shake occurrence thereof), whilst determined to belong to the single imaging area 5 according to the reduction of the zoom value thereof and also according to the increase of the degree of luminance thereof (that is, according to the reduction of provability of shake occurrence thereof)

Figure 3:
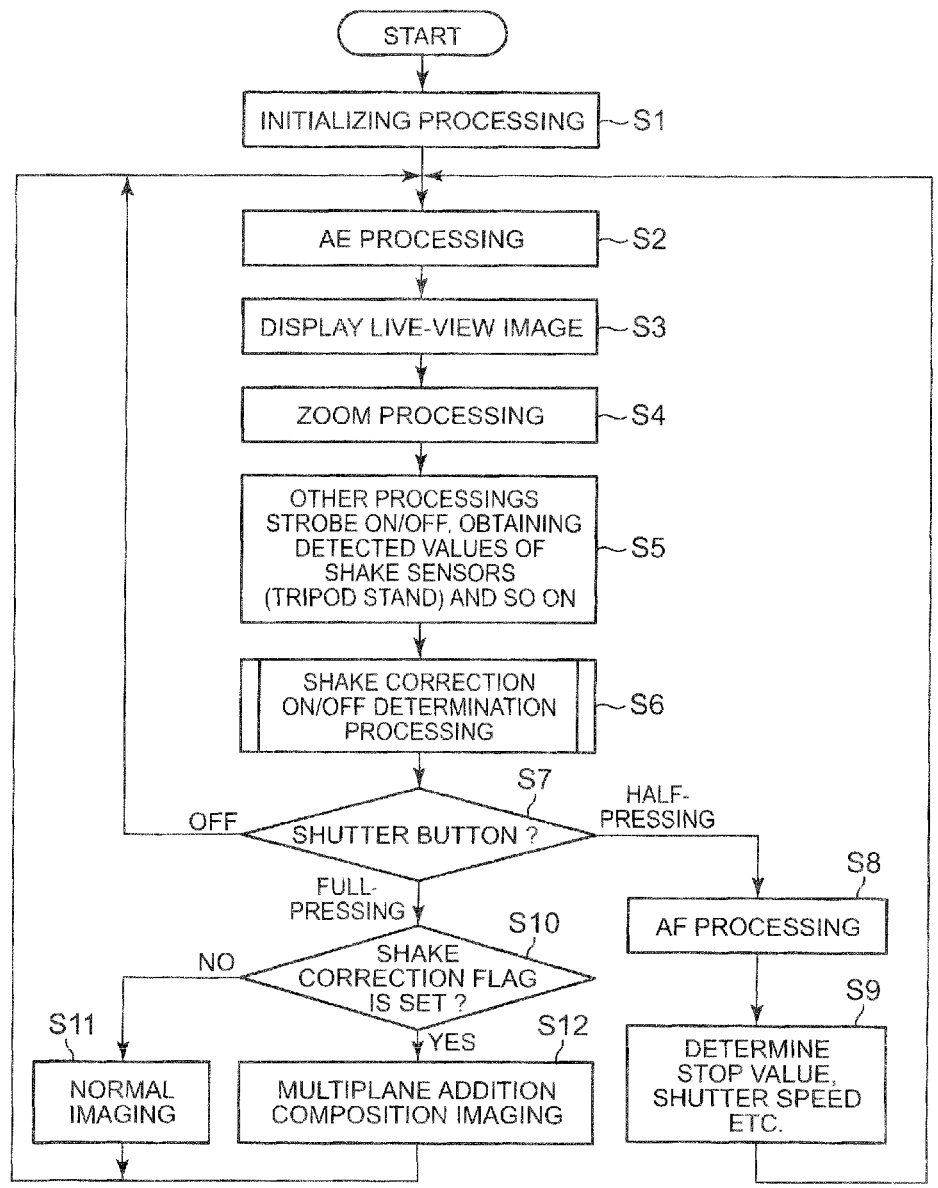
FIG. 3 is a flowchart showing the processing procedure of this embodiment.

FIG. 3 is a flowchart showing the processing procedure of this embodiment. When the power supply switch provided in the operation input unit 122 is turned on, the control circuit 102 having the CPU 103 operates and executes the processing as shown in this flowchart based on the program stored in the program memory 123. This control circuit 102 operates as a first imaging processing unit, a second imaging processing unit, a zoom detection unit, an operation detection unit and a parameter detection unit. First, the control circuit executes an initializing processing to thereby clear the contents of the buffer memories 166, 167 etc. (step S1). Next, the control circuit executes an automatic exposure (AE) processing to thereby obtain the degrees of luminance detected by the photometric/ranging sensor 139 and the detecting circuit 140 (step S2), and displays the live-view image of a shot object on the display unit 181 (step S3).

Then, the control circuit executes a zooming processing to thereby control the zoom lens driving unit 133 so as to drive the zoom lens in accordance with the operation of zoom key provided at the operation input unit 122 (step S4). Further, the control circuit executes other processings. That is, the control circuit executes a processing of determining whether or not the strobe 137 is to be operated at the time of imaging based on the degree of luminance obtained in the step S2, and further execute a processing of obtaining the detected values of the angular velocity sensor (Y/Pitch) 141 and the angular velocity sensor (X/Yaw) 143 inputted via the detecting circuits 142, 144, respectively, and so on (step S5). Succeedingly, the control circuit executes a shake correction ON/OFF determination processing (step S6).

Figure 4:
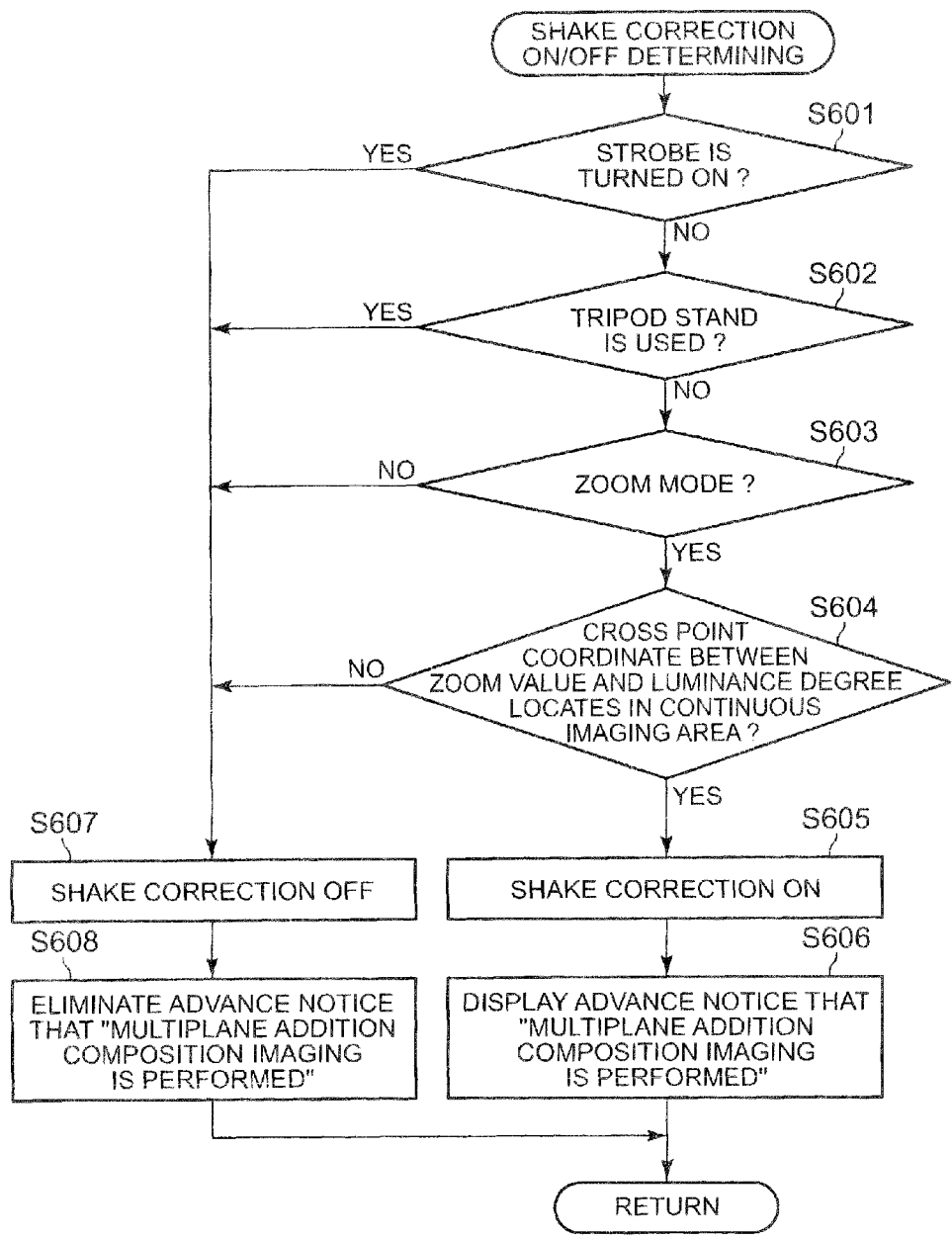
FIG. 4 is a flowchart showing the procedure of a shake correction ON/OFF determination processing.

FIG. 4 is a flowchart showing the details of this shake correction ON/OFF determination processing (step S6). That is, it is determined whether or not the turning-on of the strobe 137 upon imaging is decided in the other processings of the step S5 (step S601). In the case of performing a imaging under the turning-on state of the strobe 137, since the sufficient degree of luminance is secured and the shutter speed is high, the provability of shake occurrence is low. Thus, in the case where the turning-on of the strobe 137 upon imaging is decided (YES in step S601), the shake correction flag representing the execution of the shake correction is reset (step S607). Further, as described later, the control circuit eliminates an advance notice that "a multiplane addition composition imaging is performed" displayed on the display unit 181 (step S608).

However, in the case where the turning-off of the strobe 137 upon imaging is decided (NO in step S601) as a result of the determination in the step S601, since the shutter speed is low, the provability of shake occurrence is high. Thus, it is further determined whether or not a imaging of the digital cameral 1 is performed by using a tripod stand (step S602). To be concrete, it is determined that the tripod stand is used when the detected values of the angular velocity sensor (Y/Pitch) 141 and the angular velocity sensor (X/Yaw) 143 each obtained in the other processings of the step S5 are lower than predetermined values, respectively. In contrast, it is determined that a user performs a imaging by holding this digital camera 1 by hands when at least one of the detected values of the angular velocity sensor (Y/Pitch) 141 and the angular velocity sensor (X/Yaw) 143 is equal to or larger than the predetermined value thereof. When it is determined that the tripod stand is used, since the provability of shake occurrence is low, the processings of the aforesaid steps S607 and S608 are executed.

In contrast, when it is determined that the tripod stand is not used as a result of the determination in the step S602, since the provability of shake occurrence is high, it is determined whether or not the zoom lens is driven to a position other than the position of the zoom value (zoom)=0 (wide end) in FIG. 2 by the zooming processing in the aforesaid step S4 (step S603). When the zoom value (zoom) is 0 (wide end) and hence the digital camera is not in a zoom mode (NO in the step S603), since the provability of shake occurrence is low, the processings of the aforesaid steps S607 and S608 are executed.

When the zoom value (zoom) is not 0 (not at the wide end) and hence the digital camera is in a zoom mode (YES in the step S603), since the provability of shake occurrence is high, it is further determined whether or not the coordinate of a cross point between the zoom value and the luminance degree locates in the continuous imaging area 4 (step S604). In other words, the two-dimensional table 2 shown in FIG. 2 is referred by using the luminance degree obtained in the step S2 and the zoom value obtained in the step S4. Then, it is determined whether or not the cross point coordinate between the zoom value and the luminance degree locates in the continuous imaging area 4 in the two-dimensional table 2.

As a result of this determination, like the cross point coordinate Pb (x2, y1) or Pd (x3, y4) exemplarily shown in FIG. 2, when the cross point coordinate belongs to the single imaging area 5 (NO in step S604), since the provability of shake occurrence is low, the processings of the aforesaid steps S607 and S608 are executed.

In contrast, like the cross point coordinate Pa (x1, y1) or Pc (x3, y3), when the cross point coordinate belongs to the continuous imaging area 4(YES in step S604), since the shake occurs surely, the shake correction flag representing the execution of the shake correction is set (step S605).

In this manner, according to this invention, since the determination as to whether or not the shake correction is to be executed is performed by using the two-dimensional table 2 stored in advance, this determination can be made surely, quickly and simply.

Succeedingly, the control circuit displays the advance notice that "multiplane addition composition imaging is performed" on the display unit 181 (step S606). Thus, at the time of performing a imaging by fully pressing the shutter button, since a user can visually recognize the existence or non-existence of the advance notice that "multiplane addition composition imaging is performed" on the display unit 181, the user can perform a imaging while usually recognizing in advance whether the multiplane addition composition imaging is performed or the normal imaging is performed.

On the other hand, in the flowchart of FIG. 3, in a step S7 succeeding to the shake correction ON/OFF determination processing (step S6), the state of the shutter button is detected. When the shutter button is in an OFF state without being pressed, the processings is repeated from the step S2. On the other hand, when the shutter button is pressed halfway, an AF processing is executed to thereby drive the focus lens within the imaging optical system 156 by the focus lens driving unit 132 (step S8). Thus, a live-view image in a focused state is displayed on the display unit 181. Further, a stop value and the shutter speed are determined based on the detected degree of luminance (step S9), and the processings is repeated from the step S2.

Thus, in the state where the shutter button is not pressed or the shutter button is pressed halfway, that is, until the imaging operation is performed by fully pressing the shutter button, the shake correction ON/OFF determination processing (step S6) is repeatedly executed. That is, the determination whether or not the shake correction is to be performed (whether or not the multiplane addition composition imaging is to be performed) is made in advance before the start of a imaging while updating the determination. Accordingly, as compared with the case where the determination whether or not the shake correction is to be performed (whether or not the multiplane addition composition imaging is to be performed) is made at the time of a imaging after executing the imaging operation by fully pressing the shutter, the processing at the time of a imaging can be simplified. Therefore, the processing at the time of a imaging can be performed quickly. As a result, since the next imaging can also be performed quickly, a imaging can be performed continuously without missing a shot.

When the imaging operation is performed by fully pressing the shutter button, the CPU 103 proceeds the processing to a step S10 from the step S7 to thereby determine whether or not the shake correction flag is set. As a result of this determination, when the shake correction flag is not set but reset, the normal imaging is executed (step S11).

That is, the stop driving circuit 135 drives the stop 158 so as to be the stop value determined by the step S9. Similarly, the shutter driving circuit 136 drives the shutter 159 once so as to be the shutter speed determined by the step S9 to thereby perform a single imaging. Image data obtained by this single imaging is compressed and encoded to obtain a shot image, and this shot image is stored in the image memory medium 125.

Thus, the multiplane addition composition imaging is not performed uselessly under the imaging condition where the provability of shake occurrence is low. As a result, since the multiplane addition composition imaging is not performed without inevitability, it is possible to avoid a disadvantage that a useless addition processing is executed to thereby generate noise in a shot image stored in the image memory medium 125.

Further, when it is determined that the shake correction flag is set as the result of the determination performed in the step S10, the multiplane addition composition imaging is executed (step S12). That is, each of the imaging device 157 and the DSP unit 164 is set in a continuous imaging mode and a multiplane addition mode to thereby determine the shutter speed again based on the shutter speed determined in the step S9. To be more concrete, supposing that the shutter speed determined in the step S9 is "T" and the number of images to be added is "n", the shutter speed is set again as "T/n". For example, in the case where the numbers "n" of images to be added is 2, 4, 8, 16, . . . , the shutter speeds T are set again as "T/n", that is, T/2, T/4, T/8, T/16, . . . , respectively. Then, the imaging device 157 is driven sequentially with the shutter speed "T/n" to thereby sequentially subject n image data thus obtained to the multiplane addition composition processing. Thereafter, single shot image data obtained by this multiplane addition composition processing is compressed and encoded to obtain a shot image, and this shot image is stored in the image memory medium 125.

In this manner, since the multiplane addition composition imaging is performed inevitably under the imaging condition where the provability of shake occurrence is high, it is possible to prevent in advance the occurrence of the disadvantage that a shaken shot image is recorded. Thus, it is possible to avoid the disadvantage that noise is generated in a shot image without inevitability when the aforesaid processing of the step S11 is performed. Further, the shake correction of a shot image can be performed effectively by suitably performing the addition processing in the step S12.

In the aforesaid embodiment, although the multiplane addition processing is performed simply, the multiplane addition processing may be performed in a manner of positioning the feature amounts of a main object of continuously-shot images based on the feature amount of a background area.

As described above, although this invention is explained as to the particular embodiment, this invention is not limited thereto and contains the invention claimed in claims and invention equivalent thereto.

The invention claimed is:

1. An electronic camera, comprising:
   an optical system that has a zoom function and that provides an image of an object;
   an imaging unit that performs an exposure to take the image of the object and that obtains image data of the object;
   a first imaging processing unit that exposes the imaging unit once with a suitable exposure time being set and that outputs the obtained image data;
   a second imaging processing unit that executes shake correction by exposing the imaging unit for plural times continuously each with a same exposure time which is shorter than the set suitable exposure time and that executes an addition processing of adding respective image data obtained sequentially for the plural times of exposures;
   a control unit that operates one of the first imaging processing unit and the second imaging processing unit in accordance with a circumstance at a time of imaging;
   a zoom value obtaining unit that obtains a zoom value indicating a position of a zoom lens in the optical system; and
   a wide end detection unit that detects, based on the zoom value, whether a position of the zoom lens is on a wide end,
   wherein the control unit makes operable only the first imaging processing unit when the wide end detection unit detects that the position of the zoom lens is on the wide end, and the control unit makes selectively operable one of the first imaging processing unit and the second imaging processing unit when the wide end detection unit detects that the position of the zoom lens is not on the wide end.

2. The electronic camera according to claim 1, further comprising:
   an operation detection unit that detects an imaging operation; and
   a recording unit that records the image data processed by the first imaging processing unit or the image data processed by the second imaging processing unit in response to the imaging operation detected by the operation detection unit,
   wherein the control unit repeatedly determines, before the imaging operation is detected by the operation detection unit, as to which one of the first imaging processing unit and the second imaging processing unit is to be operated.

3. The electronic camera according to claim 2, further comprising:
   a display unit that displays a result of a determination of the control unit each time the control unit determines as to which one of the first imaging processing unit and the second imaging processing unit is to be operated.

4. The electronic camera according to claim 1, wherein, when the wide end detection unit detects that the position of the zoom lens is not on the wide end, the control unit makes selectively operable one of the first imaging processing unit and the second imaging processing unit based further on a degree of luminance of the image of the object.

5. The electronic camera according to claim 1, wherein the second image processing unit executes multiplane addition composition processing to perform shake correction.

6. The electronic camera according to claim 1, wherein, when the wide end detection unit detects that the position of the zoom lens is not on the wide end, the control unit makes selectively operable one of the first imaging processing unit and the second imaging processing unit based on a relationship between the obtained zoom value and a degree of luminance of the image of the object.

7. The electronic camera according to claim 1, further comprising a memory that stores a table which indicates a relationship between zoom values corresponding to positions of the zoom lens and degrees of luminance, and which further indicates a single imaging area corresponding to the first image processing unit and a continuous imaging area corresponding to the second image processing unit to which respective sets of a zoom value and a degree of luminance belong,
   wherein, when the wide end detection unit detects that the position of the zoom lens is not on the wide end, the control unit makes selectively operable one of the first imaging processing unit and the second imaging processing unit based on a relationship between the obtained zoom value and a degree of luminance of the image of the object, with reference to the table.

8. The electronic camera according to claim 1, wherein the zoom value obtained by the zoom value obtaining unit indicates a specific position of the zoom lens, the zoom value increasing as the specific position of the zoom lens increases in distance from the wide end, and wherein when the wide end detection unit detects that the position of the zoom lens is not on the wide end, the control unit makes selectively operable one of the first imaging processing unit and the second imaging processing unit based on the zoom value indicating the specific position of the zoom lens, which specific position is not on the wide end.

9. The electronic camera according to claim 8, wherein when the wide end detection unit detects that the position of the zoom lens is not on the wide end, the control unit makes operable only the first image processing unit when the zoom value indicating the specific position of the zoom lens is a first predetermined value and a degree of luminance of the image is not less than a second predetermined value, and the control unit makes operable only the second imaging processing unit when the zoom value indicating the specific position of the zoom lens is the first predetermined value and the degree of luminance of the image is less than the second predetermined value.

10. The electronic camera according to claim 8, wherein when the wide end detection unit detects that the position of the zoom lens is not on the wide end, the control unit makes operable only the first image processing unit when the zoom value indicating the specific position of the zoom lens is less than a first predetermined value and a degree of luminance of the image is a second predetermined value, and the control unit makes operable only the second imaging processing unit when the zoom value indicating the specific position of the zoom lens is not less than first predetermined value and the degree of luminance of the image is the second predetermined value.

11. A non-transitory computer readable medium storing a program causing a computer to execute an imaging control process, the computer including an optical system that has a zoom function and that provides an image of an object, an imaging unit that performs an exposure to take the image of the object and that obtains image data of the object, and a zoom value obtaining unit that obtains a zoom value indicating a position of a zoom lens in the optical system, the imaging control process comprising:

- first imaging processing to expose the imaging unit once with a suitable exposure time being set to thereby output the obtained image data;
- second imaging processing to execute shake correction by exposing the imaging unit for plural times continuously each with a same exposure time which is shorter than the set suitable exposure time to thereby execute an addition processing of adding respective image data obtained sequentially for the plural times of exposures;
- detecting, based on the zoom value, whether a position of the zoom lens is on a wide end; and
- operating one of the first imaging processing and the second imaging processing in accordance with a circumstance at a time of imaging;
- wherein the operating comprises operating only the first imaging processing when it is detected that the position of the zoom lens is on the wide end, and selectively operating one of the first imaging processing and the second imaging processing when it is detected that the position of the zoom lens is not on the wide end.

12. A imaging control method for an imaging apparatus including an optical system that has a zoom function and that provides an image of an object, an imaging unit that performs an exposure to take the image of the object and that obtains image data of the object, and a zoom value obtaining unit that obtains a zoom value indicating a position of a zoom lens in the optical system, the imaging control method comprising:

- first imaging processing to expose the imaging unit once with a suitable exposure time being set to thereby output the obtained image data;
- second imaging processing to execute shake correction by exposing the imaging unit for plural times continuously each with a same exposure time which is shorter than the set suitable exposure time to thereby execute an addition processing of adding respective image data obtained sequentially for the plural times of exposures;
- detecting, based on the zoom value, whether a position of the zoom lens is on a wide end; and
- operating one of the first imaging processing and the second imaging processing in accordance with a circumstance at a time of imaging;
- wherein the operating comprises operating only the first imaging processing when it is detected that the position of the zoom lens is on the wide end, and selectively operating one of the first imaging processing and the second imaging processing when it is detected that the position of the zoom lens is not on the wide end.

* * * * *